US012812494B2

(12) United States Patent
Gonzalez et al.

(10) Patent No.: US 12,812,494 B2
(45) Date of Patent: Nov. 24, 2026

(54) AUTOMATED TRIGGER CRITERIA SELECTION FOR SMART DYNAMIC HANDOVER

(71) Applicant: DISH Wireless L.L.C., Englewood, CO (US)

(72) Inventors: Norberto Amaya Gonzalez, San Diego, CA (US); Karupaiah Rajendran, Sachse, TX (US)

(73) Assignee: DISH Wireless L.L.C., Englewood, CO (US)

( * ) Notice: Subject to any disclaimer, the term of this patent is extended or adjusted under 35 U.S.C. 154(b) by 212 days.

(21) Appl. No.: 18/637,099

(22) Filed: Apr. 16, 2024

(65) Prior Publication Data

US 2025/0324340 A1 Oct. 16, 2025

(51) Int. Cl.
*H04W 36/30* (2009.01)
*H04W 36/00* (2009.01)

(52) U.S. Cl.
CPC ..... *H04W 36/30* (2013.01); *H04W 36/00837* (2018.08); *H04W 36/0085* (2018.08); *H04W 36/00833* (2023.05)

(58) Field of Classification Search
None
See application file for complete search history.

(56) References Cited

U.S. PATENT DOCUMENTS 9,479,981 B2 10/2016 Dimou et al.
9,743,328 B2 * 8/2017 Salami ............ H04W 36/00837
9,894,584 B2 * 2/2018 Moon .................... H04W 16/32
11,109,283 B1 * 8/2021 Kulkarni ............... H04W 24/02
2013/0331103 A1 12/2013 Yang et al.
2020/0314946 A1 * 10/2020 Tsuboi .................. H04W 24/10
2022/0295358 A1 * 9/2022 Liu ........................ H04W 24/02
2024/0040461 A1 * 2/2024 Da Silva ............... H04W 36/30
2024/0098597 A1 * 3/2024 Lee ....................... H04B 17/328

(Continued)

FOREIGN PATENT DOCUMENTS

WO 2021160407 A1 8/2021

OTHER PUBLICATIONS

International Search Report and Written Opinion for International Application No. PCT/US2025/023913, mailed Jul. 14, 2025, 14 Pages.

*Primary Examiner* — Jason D Cardone
(74) *Attorney, Agent, or Firm* — Lowenstein Sandler LLP

(57) ABSTRACT

Technologies for automated selection of appropriate trigger criteria for dynamic and seamless handover of an ongoing communication session in a telecommunications network, such as a cellular network, are described. One method includes measuring a variety of performance metrics associated with a plurality of nodes of the cellular network. Based on one or more of the performance metrics, a variety of trigger criteria are determined for a dynamic handover of the ongoing communication session from a first node to a second node. Based on a recent history of successful and unsuccessful handovers between the first node and the second node, a specific trigger criterion from the variety of trigger criteria is automatically selected and applied to an upcoming dynamic handover of the ongoing communication session when a user equipment (UE) moves from the first node to the second node. The dynamic handover may be inter-frequency or intra-frequency.

23 Claims, 7 Drawing Sheets

(56) References Cited

U.S. PATENT DOCUMENTS

| | | | | |
|---|---|---|---|---|
| 2025/0024335 | A1* | 1/2025 | Liu | H04W 36/0079 |
| 2025/0133469 | A1* | 4/2025 | Ickin | H04W 36/00835 |
| 2025/0168678 | A1* | 5/2025 | Belleschi | H04W 36/035 |
| 2025/0294422 | A1* | 9/2025 | Li | H04W 36/144 |
| 2026/0095833 | A1* | 4/2026 | Liu | H04B 17/382 |
| 2026/0189474 | A1* | 7/2026 | Fujishiro | H04L 41/16 |

* cited by examiner

AUTOMATED TRIGGER CRITERIA SELECTION FOR SMART DYNAMIC HANDOVER

BACKGROUND

Handover is an essential procedure in cellular networks, including the most recent generations of complex networks, such as fifth generation (5G) cellular networks. When a user equipment (UE), such as a mobile device, physically moves from one cell to another in a connected mode, handover allows the UE to stay connected, ideally without perceptible interruption to the user experience.

Advanced 5G wireless networks, such as 5G New Radio (NR) cellular networks, have the promise to provide higher throughput, lower latency, and higher availability compared with previous global wireless standards. However, some parameters in a 5G NR cellular network cannot be modified dynamically during handover, which may compromise user experience.

BRIEF DESCRIPTION OF THE DRAWINGS

The present disclosure is illustrated by way of example, and not by way of limitation, in the figures of the accompanying drawings.

DETAILED DESCRIPTION

Figure 1:
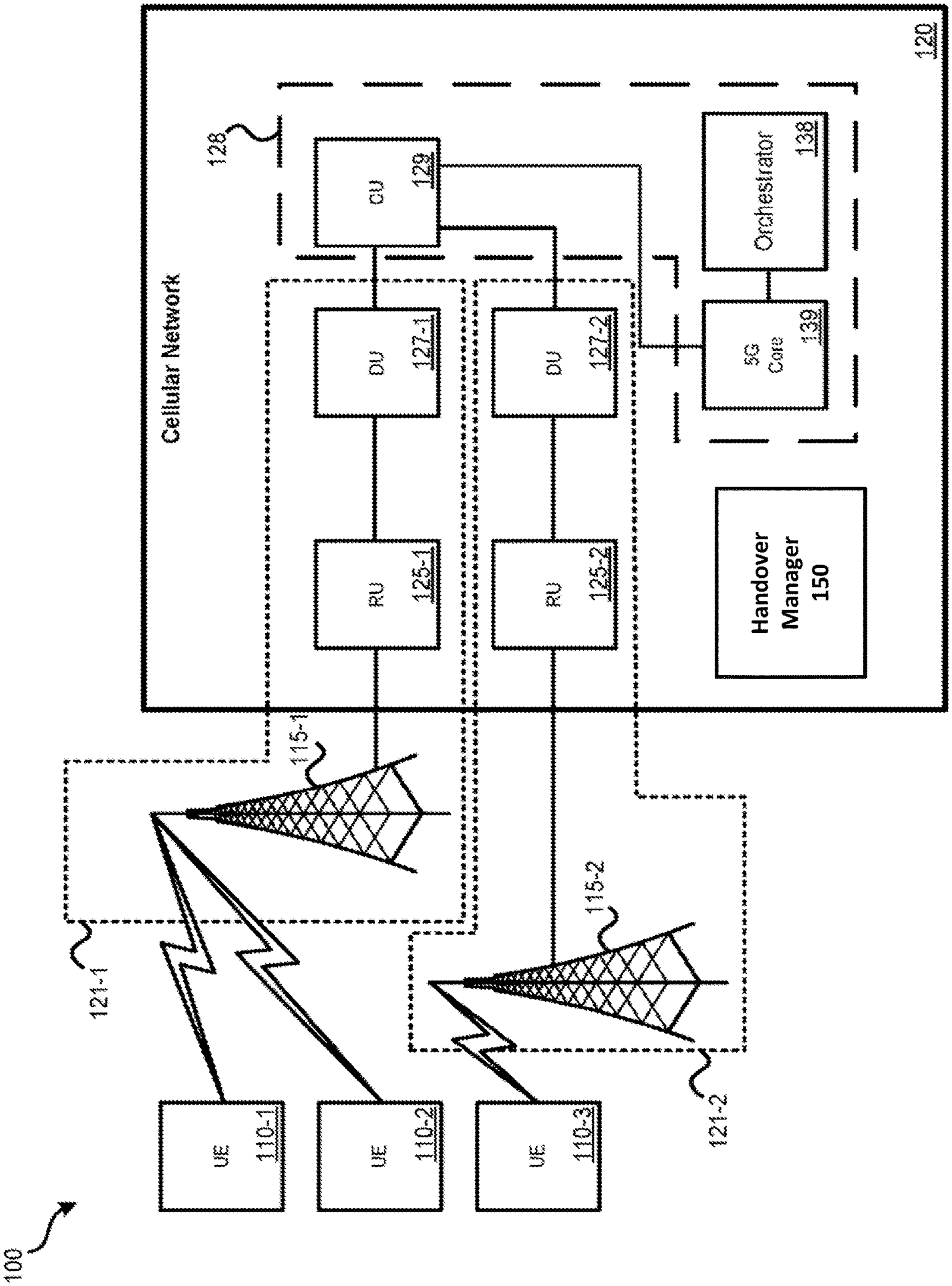
FIG. 1 is a block diagram of a system implementing smart dynamic handover in a cellular network according to at least one embodiment.

Technologies for automated selection of trigger criteria for dynamic and seamless handover of an ongoing communication session in a telecommunications network, such as a cellular network (e.g., 5G wireless network), are described. The scope of this disclosure is not limited to 5G networks, though, and previous generations of networks (such as 4G LTE) as well as upcoming future generations of networks (such as, 6G and 7G) are also encompassed by this disclosure. Examples of the communication session include, but are not limited to, a voice call, a video call, a data call, an internet browsing session, etc. In this specification, sometimes simply the word "call" has been used to indicate a communication session. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

Signaling within the cellular network ensures that an ongoing communication session, along with its context information, is suitably transferred from a source cell to a target cell in a cellular network. In connected mode, a UE makes regular measurements of neighboring cells and reports the measurements to some component of the cellular network. The cellular network decides whether and at what point the UE should be handed over from one cell to the next cell as the UE keeps moving. This decision may be made at the control plane level of a 5G core network. However, there is a possibility of the ongoing session being interrupted (e.g., a voice call being dropped) if proper trigger criteria are not selected for handover, especially in the presence of external interference from other operators and/or internal interference from other frequency channels within the same operator's cellular network.

Aspects and embodiments of the present disclosure address the above and other deficiencies by providing a system that implements automated selection of a specific trigger criterion for handover that has the highest likelihood of success for a successful handover between a particular pair of cells, even in the presence of external or internal interference. Typically, each cell is associated with a base station in the cellular network. The base station (often referred to as a "gNodeB" or "gNB" in a 5G cellular network) refers to a network element responsible for the transmission and reception of radio signals to or from one or more user equipment (UE) while those UEs are physically within the coverage area of a particular base station. Each base station may correspond to one or more cells. Note that in the specification and claims, the term "node" has been used to indicate a cell site. A "source cell" is the cell that a UE is currently connected to. A "target cell" is one of the plurality of neighboring cells (i.e., neighboring the source cell) to which the UE gets connected after a successful handover. The parameters associated with the base station may include one or more parameters characterizing: data demand associated with the base station at a point of time, the number of user equipment (UE) connected to the base station at a point of time, occurrence of radio link failure associated with the base station over a certain period of time, or one or more key performance indicators (KPIs) of an infrastructure resource of the cellular network associated with the base station.

KPIs can be calculated based on measured values of metrics that indicate the state of connection between the UE and a particular node, such as, Reference Signal Received Quality (RSRQ), Reference Signal Received Power (RSRP), Signal-to-Interference-plus-Noise Ratio (SINR) etc. KPIs can further include Received Signal Strength Indicator (RSSI), Packet Data Convergence Protocol Downlink Throughput (PDCP DL Throughput), and Primary Component Carrier Physical Downlink Throughput (PCC PHY DL Throughput) etc. Note that not all of these KPIs need to be measured for each node. Also, some composite KPIs may be calculated by combining two or more KPIs with corresponding weights applied to each of the individual KPIs.

The data demand associated with the base station may include a prediction of data size at a specific time instant, for example, based on historical data of data demand at a certain time of a day for the last 'n' days. The specific time instant is important to decide what is the optimum time to handover a call. The number of user equipment (UE) connected to the base station may include a count (e.g., in real-time) of UE connected to the base station. The occurrence of radio link failure associated with the base station may include a count (e.g., over a period) of radio link failures between UE and the base station. The state of UE may include idle mode or connected mode of the UE or the proximity (e.g., measured by distance) to the base station.

FIG. 1 illustrates an embodiment of a cellular network system 100 ("system 100"). Network system 100 can accommodate a cloud-based architecture. System 100 can include a 5G New Radio (NR) cellular network; other types of cellular networks, such as 6G, 7G, etc. may also be possible. System 100 can include: UEs 110 (UE 110-1, UE 110-2, UE 110-3); base station 121; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit radio frequency (RF), the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 110 may use RF to communicate with various base stations of cellular network 120. Two base stations 121 are illustrated: base station 121-1 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other human-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations (BSs) and many CUs and 5G core 139. Structures 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station 121 equipment may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the Citizens Broadband Radio Service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized O-RAN implementation, CU 129, 5G core 139, and/or orchestrator 138 can be implemented virtually as software being executed by general-purpose computing equipment, such as in a data center of a cloud-computing platform, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the quality of service (QoS) and quality of experience (QoE) for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

5G core 139, which can be physically distributed across data centers or located at a central national data center (NDC), can perform various core functions of the cellular network. 5G core 139 can include: network resource management components; policy management components; subscriber management components; and packet control components. Individual components may communicate on a bus, thus allowing various components of 5G core 139 to communicate with each other directly. 5G core 139 is simplified to show some key components. Implementations can involve additional other components.

Network resource management components can include network repository function (NRF) and network slice selection function (NSSF). NRF can allow 5G network functions (NFs) to register and discover each other via a standards-based application programming interface (API). NSSF can be used by access and mobility management function (AMF) to assist with the selection of a network slice that will serve a particular UE.

Policy management components can include charging function (CHF) and policy control function (PCF). CHF allows charging services to be offered to authorized network functions. Converged online and offline charging can be supported. PCF allows for policy control functions and the related 5G signaling interfaces to be supported.

Subscriber management components can include unified data management (UDM) and authentication server function (AUSF). UDM can allow for generation of authentication vectors, user identification handling, NF registration management, and retrieval of UE individual subscription data for slice selection. AUSF performs authentication with UE.

Packet control components can include access and mobility management function (AMF) and session management function (SMF). AMF can receive connection- and session-related information from UE and is responsible for handling connection and mobility management tasks. SMF is responsible for interacting with the decoupled data plane, creating, updating, and removing protocol data unit (PDU) sessions, and managing session context with the user plane function (UPF).

User plane function (UPF) can be responsible for packet routing and forwarding, packet inspection, QoS handling, and external PDU sessions for interconnecting with a data network (DN) (e.g., the Internet) or various access networks. Access networks can include the RAN of cellular network 120.

5G core 139 may reside on a cloud computing platform. While from a client's or user's point of view, the "cloud" can be envisioned as an ephemeral computing workspace that occupies no physical space, in reality, a cloud computing platform is an interconnected group of data centers throughout which computing and storage resources are spread. Therefore, data centers may be scattered geographically and can provide redundancy.

In some embodiments, the cellular network 120 includes a handover manager 150 that implements dynamic handover in a cellular network. In some embodiments, the handover manager 150 is part of the base station(s).

A network layer protocol, known as Radio Resource Control (RRC) protocol, is used between UE and a base station for connection establishment and release functions while the UE is moving from one cell site to a neighboring cell site. An RRC Reconfiguration message is a command to modify an RRC connection, which is needed for a successful handover, as shown in FIGS. 4-7 below.

Note that the handover can be inter-frequency or intra-frequency. Intra-frequency handover occurs when the UE moves from one cell to another cell within the same frequency band. This means that the UE does not need to tune to a different frequency to communicate with the new base station. Intra-frequency handover may be simpler or faster than inter-frequency handover, as it only requires measuring signal strength and quality (and/or other metrics) of the neighboring cells and selecting the best candidate for handover. In contrast to intra-frequency handover, inter-frequency handover occurs when the UE moves from one cell to another in a different frequency band. This means the UE has to switch to a new frequency to communicate with the new base station. Therefore, sometimes inter-frequency handover is more complex and time-consuming than intra-frequency handover, as it involves measuring the signal strength and quality (and/or other metrics) of neighboring cells in different frequency bands and synchronizing the UE with the new frequency. Inter-frequency handover can also be inter-RAT, depending on whether the new cell belongs to the same or a different radio access technology (RAT), such as between a 5G network and a 4G network. Another scenario where handover (inter- or intra-frequency) can occur is when the UE loses access to a geographical region because it has roamed into a different geographical region.

This disclosure provides solutions for a component (such as handover manager 150 in FIG. 1) to choose an appropriate trigger event for a successful handover based on a particular environment, for example, when there is external interference from other networks. Handover trigger events are particular events that trigger a UE to change cell and/or frequency band while it is in use or at least take a certain step towards the final action of changing cell and/or frequency band. In cellular networks, these frequency bands are called "channels." Within each spectrum of radio frequency, there are multiple radio-frequency (RF) channels. Absolute radio-frequency channel number (ARFCN) is a unique number or code that specifies a pair of physical radio carriers used for transmission and reception-one for the uplink signal and the other for the downlink signal.

A handover manager can control the inter-frequency or intra-frequency handover by calculating a variety of performance metrics (based on measurements at the UE) associated with various cells within a cellular network operated by a first operator, including a source cell and one or more target cells. Based on the measured values of the performance metrics, a variety of trigger criteria for call handovers are determined. In certain scenarios, the handover manager may determine that a value of a first performance metric associated with the source cell and/or the target cell fails to meet a predetermined threshold value in the presence of external interference caused by a second cellular network operated by a second operator different from the first operator. The handover manager then combines a second performance metric with the first performance metric to determine a suitable handover trigger criterion to be applied. The new trigger criterion combining the two or more performance metrics is then added among a list of possible trigger criteria for handover between the source cell and a specific target cell.

Figure 2:
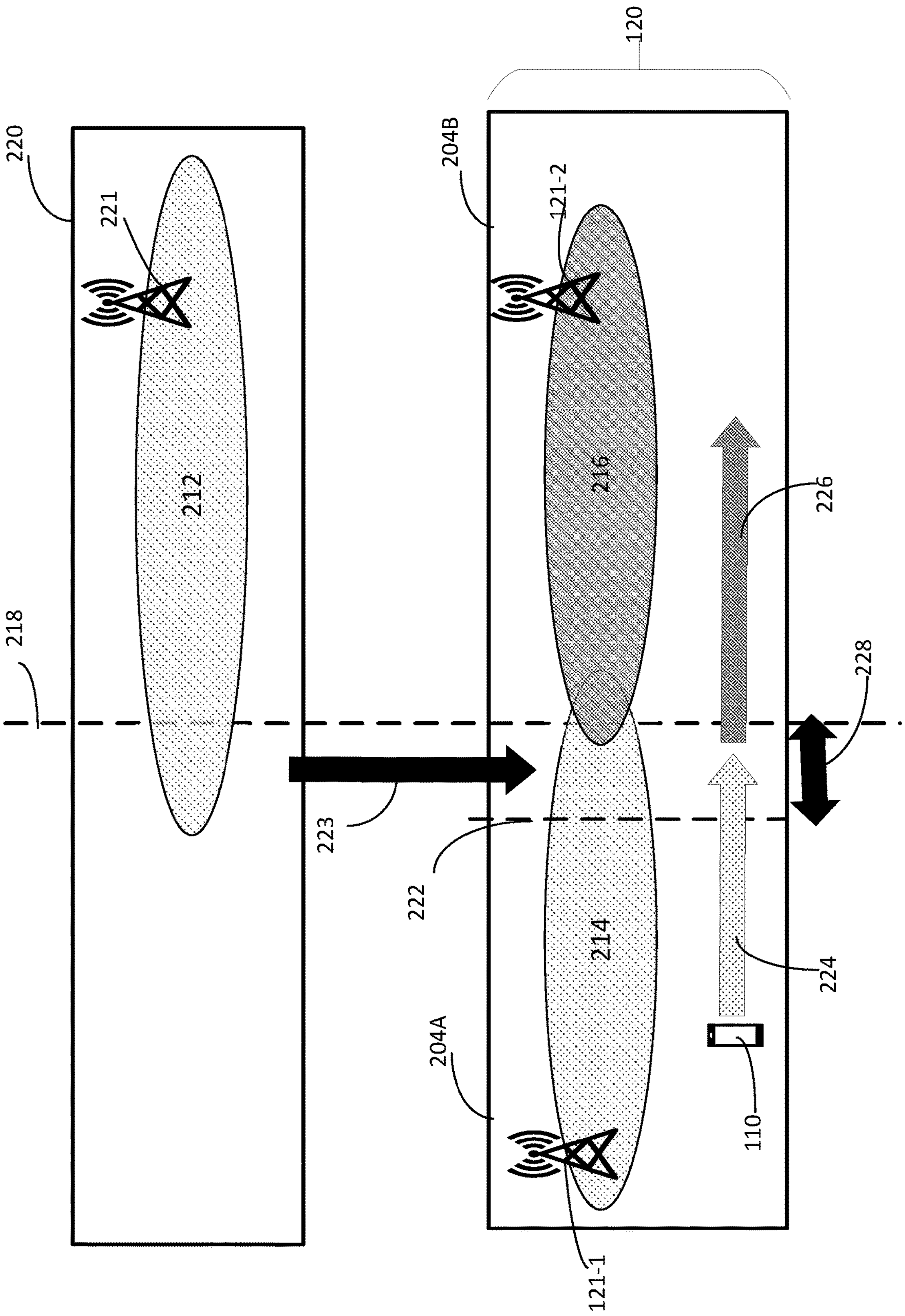
FIG. 2 illustrates a use case of appropriate performance metric based smart dynamic handover in the presence of external interference, according to at least one embodiment.

FIG. 2 illustrates a use case of appropriate performance metric based smart dynamic handover in the presence of external interference, according to at least one embodiment. In FIG. 2, a UE 110 is currently connected to a source cell 214, but is physically moving away from source cell 214. Source cell 214 is in the geographical region 204A served by base station 121-1 (such as base station 121-1 shown in FIG. 1). Target cell 216 is in the geographical region 204B served by base station 121-2 (such as base station 121-2 shown in FIG. 1) across the line 218, which represents a border for the "area of interest" (AOI). In a non-limiting example, the line 218 may be the dividing line between two neighboring counties in a state. Both the counties may be served by a single operator's cellular network, such as cellular network 120 shown in FIG. 1, or by more than one network operators.

Inter-frequency handover between source cell 214 and target cell 216 can occur when UE 110 moves from source cell 214 with one frequency channel (e.g., ARFCN A) to the neighboring target cell 216 with a different frequency channel (e.g., ARFCN B). In certain cases, both source cell 214 and target cell 216 will have the same frequency band, and intra-frequency handover is sufficient. The target cell may be operated by the same operator or may be operated by a different network operator having different network parameters. In the use case scenario of FIG. 2, handover between two cells of the same operator is depicted. But the handover environment is made more challenging by the presence of the cellular network 220 operated by a second operator. Base station 221 is controlled by the second operator. Base station 221 caters to the cell 212, which corresponds to an available neighboring cell with respect to the source cell 214. In certain scenarios, such as roaming, the UE may need to connect to cell 212 operated by the different operator to maintain consistent user experience if target cell 216 operated by the same operator is overloaded or malfunctioning for other reasons. If cell 212 is at the same frequency channel as cell 214, intra-frequency handover between cells 214 and 212 may be technically a simpler handover, than the inter-frequency handover between cells 214 and 216. However, as described with respect to FIGS. 4-7, recognizing the frequency channel of the target cell is just one factor that the handover manager 150 takes into account while making a decision to handover the call to the target cell.

In general, the handover decision is taken by the handover manager 150 in the base station or elsewhere in the network 120 based on the measurement reports from the UE. There are multiple measurement items, such as RSRP, RSRQ, SINR etc., included in the measurement report based on which the KPIs are calculated. In an ideal case, there is no external interference and the base station allows UE to report source cell and target cell signal quality and trigger the handover with a single measurement. But in practice, this can lead to unnecessary back and forth ("ping pong") handovers between the source cell and the target cell. In FIG. 2, the arrows 224 and 226 indicate an inter-frequency handover from source cell 214 (at frequency band ARFCN A) to target cell 216 (at frequency band ARFCN B) in the presence of interference signal 223. Interference signal 223 may be caused by another operator's network (external interference) or channel interference caused by the same network operator. While UE 110 is physically in the overlap region 228 between the demarcation lines 222 and 218, some measured metrics may show erratic values to make a simple handover decision. The handover manager 150 shown in FIG. 1 has to have a variety of trigger criteria, each trigger criterion depending on one or more KPIs or a combination of KPIs, to decide which one to apply to cause the handover. For example, region 228 may be associated with possibly high SS-RSRP (Synchronization Signal RSRP), but low SS-SINR and/or low SS-RSRQ because of the interference. The handover manager 150 may choose an SINR and/or RSRQ based handover trigger criterion to handover a call from ARFCN A to ARFCN B.

To avoid unwanted ping pong handover, a predetermined set of measurement reports are performed by the UE based on the RRC Reconfiguration command received by the UE. The predetermined measurement report contains reports about various types of "events" when measured values of certain performance metrics for a certain cell cross or fall below certain predetermined thresholds. The type of event a UE is required to report is specified by the RRC signaling message sent by the base station.

For 5G NR, some specified events are:

Event A1 (Serving Cell becomes better than threshold)

Event A2 (Serving Cell becomes worse than threshold)

Event A3 (Neighboring Cell becomes offset better than a Special Cell (SpCell))

Event A4 (Neighboring Cell becomes better than threshold)

Event A5 (SpCell becomes worse than a first threshold and neighboring cell becomes better than a second threshold)

Event A6 (Neighboring cell becomes offset better than a secondary cell (SCell))

Event B1 (Inter RAT neighboring cell becomes better than threshold)

Event B2 (Primary Cell (PCell) becomes worse than a first threshold and inter-RAT neighboring cell becomes better than a second threshold)

In the above events, serving cell is the current source cell that the UE is connected to. A neighboring cell is a possible target cell. SpCell is a "special cell." SCell is a "secondary cell." PCell is a "primary cell." Note that serving cells can be primary or secondary. Events A1-A6 are specified for handover triggers within same RAT and B1-B2 are specified for handover triggers between different RATs. The UE keeps measuring the serving cell (also called the source cell) and neighboring cells (target cells), reports their respective measured quantities, and validates them against the threshold or offset defined in the report configuration. The KPI for the trigger for an event can be RSRP, RSRQ or SINR themselves or a new KPI calculated based on the measured RSRP, RSRQ or SINR. Note that depending on the particular scenario, two or more KPIs may be combined to decide an appropriate trigger criterion. For example, as shown in FIG. 2, in a scenario with external interference, RSRQ and SINR may be combined to come up with a new composite KPI. Individual KPIs may be weighted differently to calculate the composite KPI.

The handover manager 150 decides which particular measurement events to include to set a particular trigger criterion. For example, for Event A2, a measured quantity of serving cell becomes worse than a predetermined threshold. Event A2 is typically used to trigger a mobility procedure when a UE moves towards cell edge. Event A2 does not involve any neighboring cell measurements, but Event A2 may be used to trigger neighboring cell measurements which can then be used for a measurement based mobility procedure. For example, the gNB may configure measurement gaps and inter-frequency or inter-system measurements after Event A2 has been triggered. This approach means that the UE only needs to complete the intra/inter frequency or inter system measurements where coverage conditions are relatively poor and there is a high chance that a handover will be required.

Examples of trigger conditions based on Event A2 are:

$$Ms+Hys<Thresh \text{ (Trigger Condition)}$$

$$Ms-Hys>Thresh \text{ (Cancellation Condition)}$$

The variables used in the equations above are defined as follows:

"Ms" is the measurement result of the serving cell without taking any offsets into account. Ms can be expressed in dBm in case of RSRP, or in dB in case of RSRQ and SS-SINR "Hys" is the hysteresis parameter for A2 event expressed in dB. Hysteresis is signaled within reportConfigNR as a value between 0 and 30. The actual value in dB can be obtained by multiplying the signaled value by 0.5; e.g., if the signaled value is 5, then Hys=5×0.5=2.5 dB "Thresh" is the threshold parameter for this event as defined within RRC Reconfiguration message. Threshold is expressed in the same unit as Ms Another example of trigger event may be Event A3, where neighboring cell becomes better than a special cell by an offset amount. A special cell is the primary serving cell (source cell). The offset can be either positive or negative. This event is typically used for intra-frequency or inter-frequency handover procedures. When Event A2 is triggered, the UE may be configured with measurement gaps to measure the inter-frequency objects and Event A3 for inter-frequency handover. Event A3 provides a handover triggering mechanism based upon relative measurement results, e.g., it can be configured to trigger when the RSRP of a neighboring cell is stronger than the RSRP of the special cell.

Examples of trigger conditions based on Event A3 are:

$$Mn+Ofn+Ocn-Hys>Mp+Ofp+Ocp+Off \text{ (Trigger Condition)}$$

$$Mn+Ofn+Ocn+Hys<Mp+Ofp+Ocp+Off \text{ (Cancellation Condition)}$$

The variables used in the equations above are defined as follows:

Mn is the measurement result of the neighboring cell, not taking into account any offsets.

Ofn is the measurement object specific offset of the reference signal of the neighbor cell Ocn is the cell specific offset of the neighboring cell as defined within measObjectNR corresponding to the frequency of the neighboring cell, and set to zero if not configured for the neighbor cell.

Mp is the measurement result of the SpCell, not taking into account any offsets.

Ofp is the measurement object specific offset of the SpCell as defined within measObjectNR corresponding to the SpCell.

Ocp is the cell specific offset of the SpCell as defined within measObjectNR corresponding to the SpCell, and is set to zero if not configured for the SpCell.

Hys is the hysteresis parameter for this event i.e., hysteresis as defined within reportConfig Off is the offset parameter for this event i.e., a3-Offset as defined within reportConfig Mn, Mp are expressed in dBm in case of RSRP, or in dB in case of RSRQ and SS-SINR Given the illustrative examples of Events A2 and A3, persons skilled in the art would appreciate that the handover manager can choose any combination of KPIs and Events to decide when to handover a call from a source cell to a target cell.

In some implementations, a system (e.g., system 100 in FIG. 1) may include a computing system, such as the handover manager 150, to facilitate a cellular network (e.g., the cellular network 120 in FIG. 1) to accomplish certain functionalities. The computing system may include one or more processing devices and memory communicatively coupled with and readable by the one or more processing devices and having stored therein processor-readable instructions which, when executed by the one or more processing devices, cause the one or more processing devices to perform operations described herein.

The computing system may be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), a computing device in a data center, or such computing device that includes memory and a processing device.

The processing device may represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. Processing device may be configured to execute processor-readable instructions for performing the operations and steps discussed herein.

The memory may represent any combination of the different types of non-volatile memory devices (e.g., not- and (NAND) type flash memory and write-in-place memory, such as a three-dimensional cross-point ("3D cross-point") memory device) and/or volatile memory devices (e.g., random access memory (RAM), such as dynamic random access memory (DRAM) and synchronous dynamic random access memory (SDRAM)). Examples of memory include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory further include a dual in-line memory module (DIMM), a small outline DIMM (SO-DIMM), and various types of non-volatile dual in-line memory modules (NVDIMMs).

In some implementations, a system (e.g., system 100 in FIG. 1), may include one or more non-transitory, computer-readable storage media having computer-readable instructions thereon which, when executed by one or more processing devices, cause the one or more processing devices to perform operations described herein. The term "computer-readable storage medium" should be taken to include a single medium or multiple media that store the one or more sets of instructions. The term "computer-readable storage medium" shall also be taken to include any medium that is capable of storing or encoding a set of instructions for execution by the machine and that causes the machine to perform any one or more of the methodologies of the present disclosure. The term "computer-readable storage medium" shall accordingly be taken to include, but not be limited to, solid-state memories, optical media, and magnetic media. Processor-readable instructions or computer-readable instructions may include instructions to implement functionality corresponding to a handover manager 150.

Figure 3:
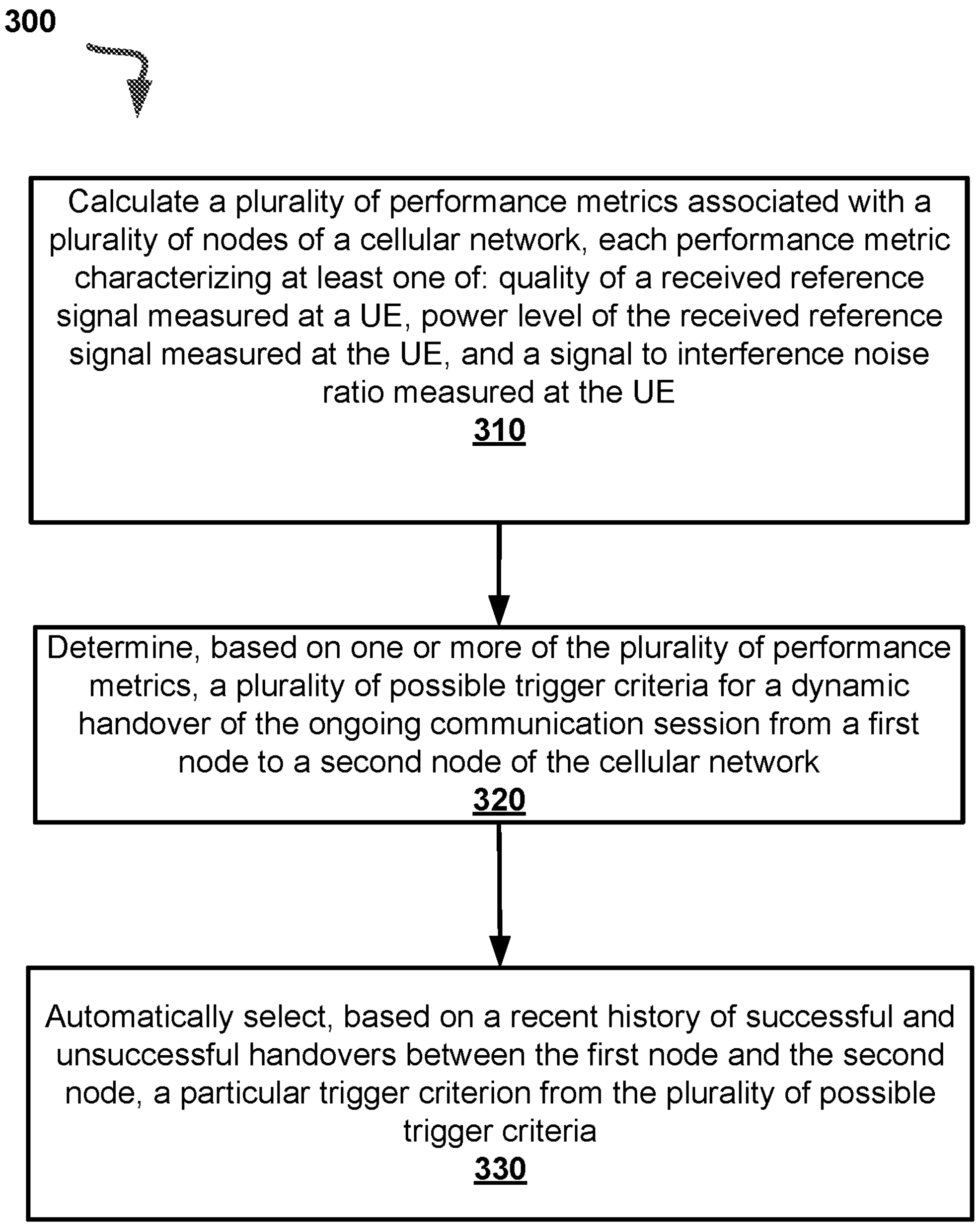
FIG. 3 is a flow diagram of an example method of a smart dynamic handover in a cellular network according to at least one embodiment.

FIG. 3 is a flow diagram of a method 300 of a smart dynamic handover in a cellular network according to an embodiment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by the components of the system 100 of FIG. 1. In one embodiment, the method 300 is performed by the handover manager 150.

At operation 310, a processing logic in the handover manager 150 calculates a plurality of performance metrics associated with a plurality of nodes of the cellular network, such as network 120. Each performance metric of the plurality of performance metrics characterizes at least one of: quality of a received reference signal measured at a user equipment (UE), power level of the received reference signal measured at the UE, and a signal-to-interference-plus-noise ratio measured at the UE. Other performance metrics can be used too. Performance metrics can be the measured values of RSRP, RSRQ, SINR, as received from the UE, or KPIs calculated based on their measured values. KPIs can be a combination of one or more performance metrics. Note that since the handover manager needs to decide which one of the plurality of neighboring target cells is the best candidate to handover a call from the source cell in a connected mode, the handover manager may want the UE to measure more than one target cell.

At operation 320, the processing logic at the handover manager 150 determines, based on one or more of the plurality of performance metrics, a plurality of possible trigger criteria for a dynamic handover of the ongoing communication session from a first node of the plurality of nodes to a second node of the plurality of nodes. As described above, each "node" represents a base station corresponding to one or more cells. In the simplest embodiment, each node corresponds to one cell.

At operation 330, the processing logic of the handover manager 150 automatically selects, based on a recent history of successful and unsuccessful handovers between the first node and the second node, a particular trigger criterion from the plurality of possible trigger criteria. The recent history of successful and unsuccessful handovers between two particular nodes can include a time log of different scenarios. For example, the log can include how many times a handover was successful based on RSRP alone, or if RSRP alone led to handover failure, but a combined KPI based on RSRQ and SINR led to successful handover at a particular time of the day when call volume is expected to be high. If too many UEs are already connected to a particular target cell, i.e., the cell load is high already, which may mean handling over another call to the already overloaded cell may cause call quality to suffer, the handover manager 150 may choose a different target cell to handover the call to. In another alternative scenario, the log can also track when external interference is causing handover failure. Since the UE can take and report measurements of signals coming from a neighboring cell operated by a different network too, if the interference is excessive, the handover manager 150 can send a complaint to the regulatory body responsible for spectrum allocation between different operators in different geographic areas.

Though not specifically shown in FIG. 3 as a separate step, the processing logic of the handover manager 150 applies the selected particular trigger criterion to the dynamic handover of the ongoing communication session when the UE moves away from the first node towards the second node.

Figure 4:
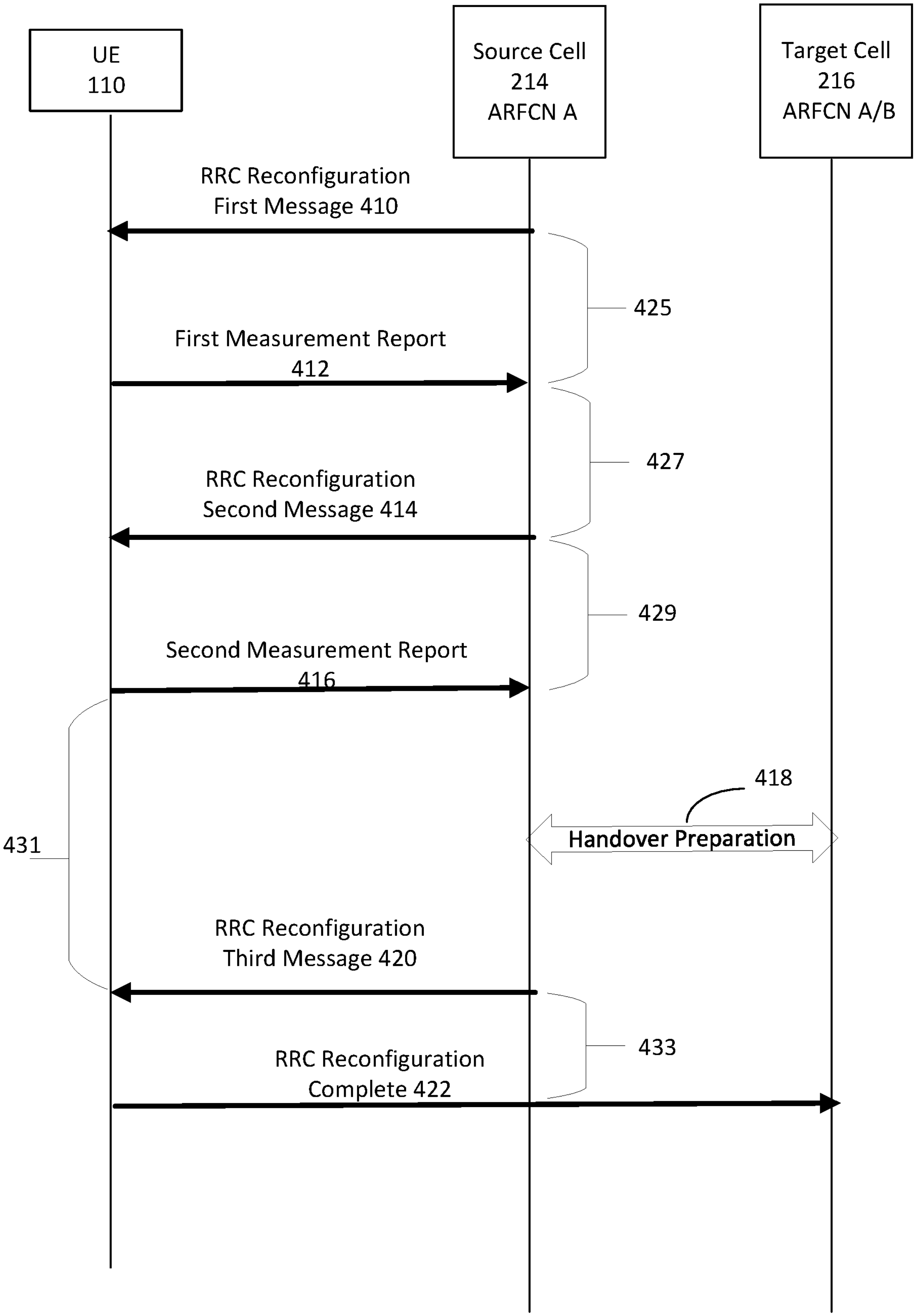
FIG. 4 is a high-level sequence diagram ("call flow") of a process for an inter or intra-frequency handover based on Radio Resource Control (RRC) Reconfiguration, according to an embodiment of the present disclosure.
Figure 5:
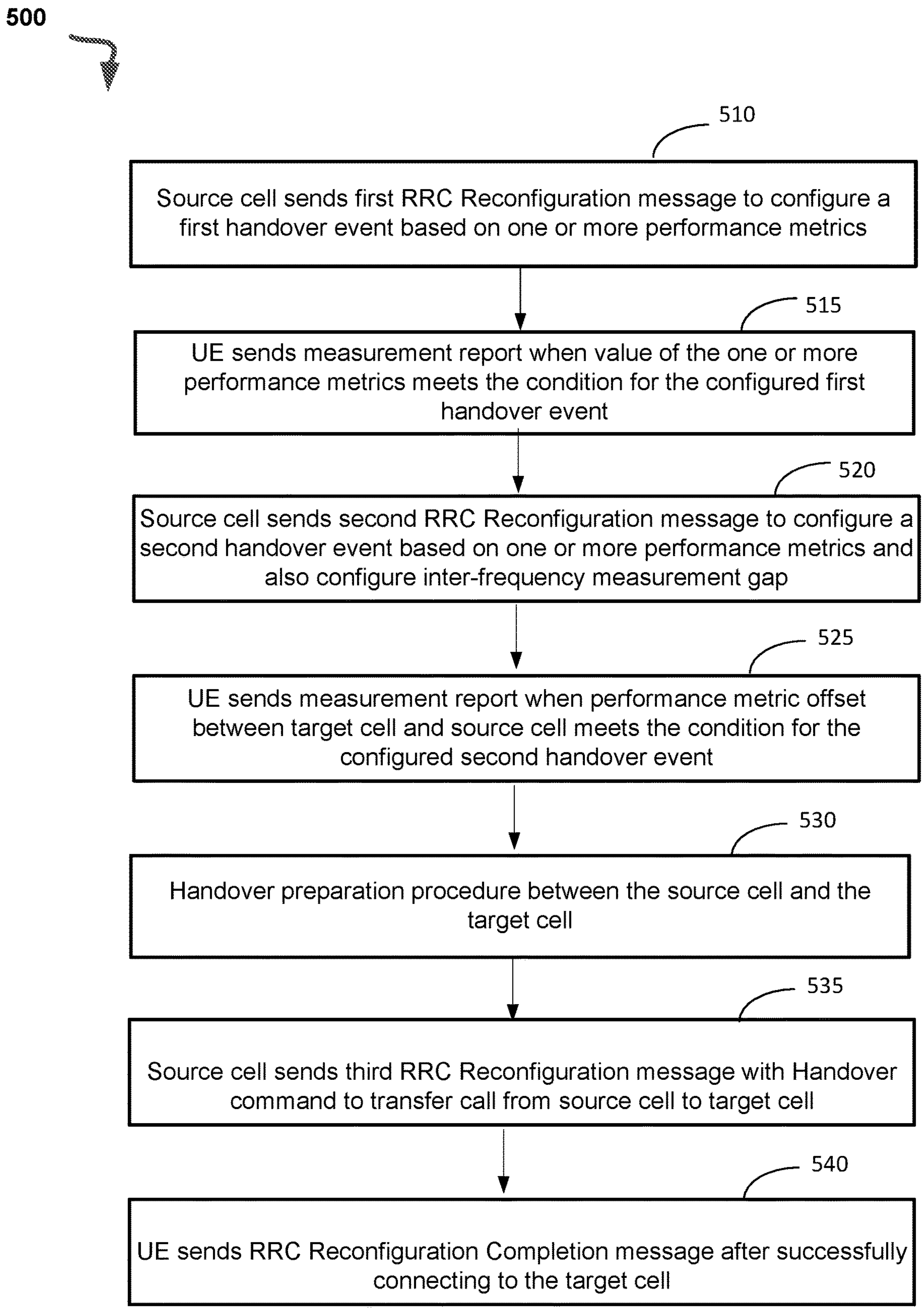
FIG. 5 is a flow diagram of the example method corresponding to the sequence diagram depicted in FIG. 4.

FIG. 4 is a high-level sequence diagram ("call flow") of a process for an inter- or intra-frequency handover based on RRC Reconfiguration, according to an embodiment of the present disclosure. FIG. 5 is a flow diagram of the example method 500 corresponding to the sequence diagram depicted in FIG. 4. FIGS. 4 and 5 are described together below. Some of the steps of the example method 500 are performed at the UE that is moving from a source cell to a target cell in a connected mode, and some other steps are performed by the source cell and/or the target cell. Drawing parallel to FIG. 2, the source cell can be at ARFCN A, while the target cell can be ARFCN B. However, the target cell can also be at ARFCN A.

Referring to FIG. 5, at operation 510, source cell 214 sends a first RRC reconfiguration message 410 to the UE 110 to configure parameters of a first handover event based on one or more performance metrics. For example, if the source cell is at ARFCN A, parameters applicable to ARFCN A are taken into account in the reconfiguration message 410. Example of the first handover event can be Event A2, as described above. An Event A2 might not happen for a certain length of time. However, measurement reports from UE can be sent at particular intervals to the base station anyway.

At operation 515, UE sends a first measurement report 412 when measured value of one or more performance metrics meets conditions for the first handover event. For example, value of SS-RSRQ goes below a certain threshold to meet the conditions of trigger Event A2. This can happen after an arbitrary time interval 425 after receiving the message 410.

However, once the first measurement report 412 is sent to source cell 214, a measurement gap is calculated based on the first handover event. At operation 520, source cell sends a second RRC reconfiguration message 414 to the UE to configure a second handover event based on one or more performance metrics. The configuration also includes the calculated measurement gap for inter-frequency handover.

At operation 525, UE sends a second measurement report 416 when the performance metric offset between target cell and source cell meets the condition for the configured second handover event. For example, the UE sends a measurement report 416 when SS-RSRQ offset, between the target cell at ARFCN B and the source cell on ARFCN A, meets the Event A3 triggering conditions. The measurement gap is shown as 429.

At operation 530, handover preparation procedure 418 between the source cell and the target cell starts. This handover preparation procedure could be between two base stations or within the two cells of the same base station. The processing time for the handover preparation procedure is shown as 431.

After the preparation procedure is completed, at operation 535, a third RRC Reconfiguration message 420 is sent from the source cell to the UE 110 with a handover command towards the detected target cell, which may be on ARFCN B (or even on ARFCN A).

Once the UE 110 is successfully connected to the target cell on ARFCN B (or ARFCN A), the UE sends an RRC Reconfiguration Complete message 422 to indicate that the handover is complete.

Figure 6:
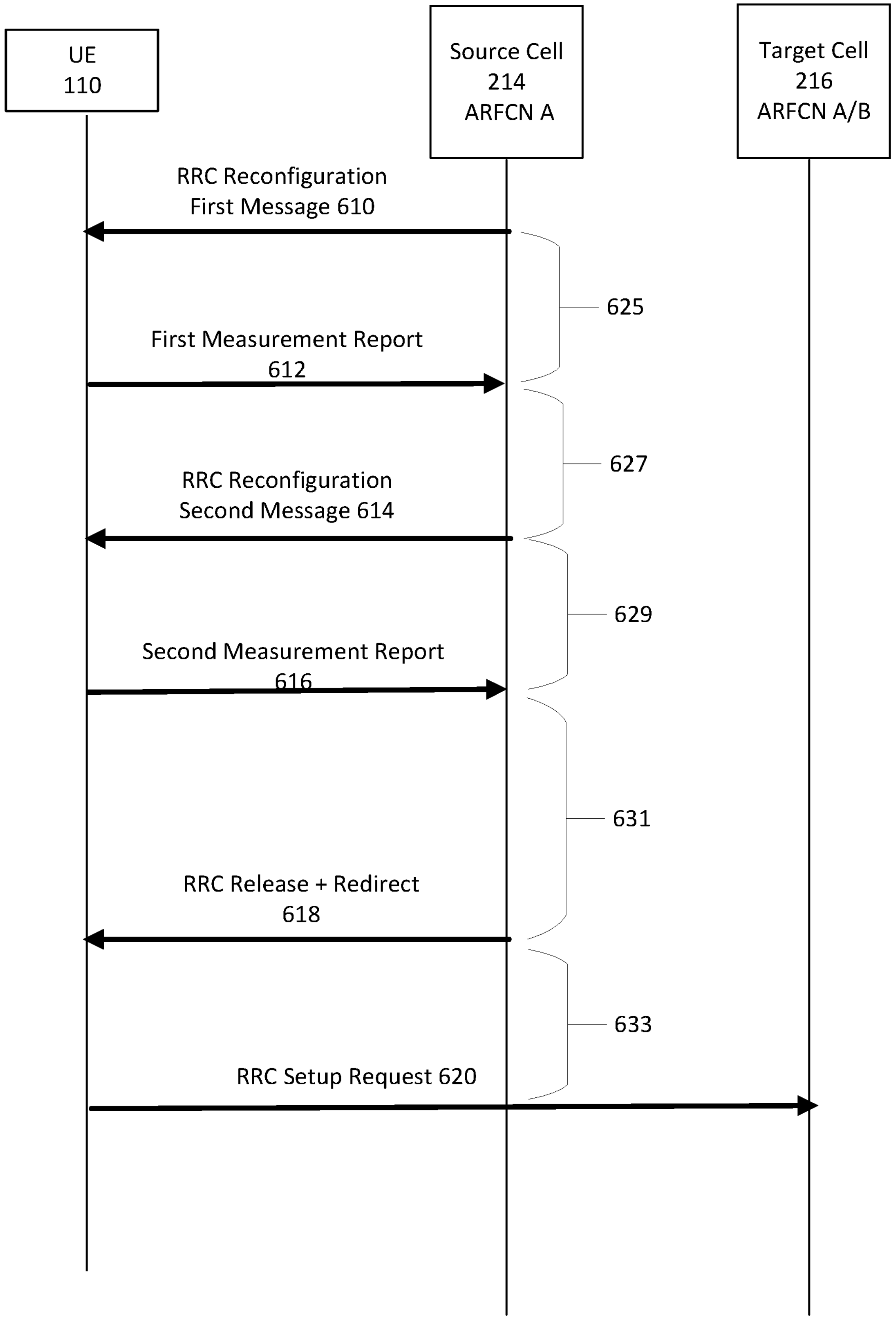
FIG. 6 is a high-level sequence diagram ("call flow") of a process for RRC Release and Redirection, according to an embodiment of the present disclosure.
Figure 7:
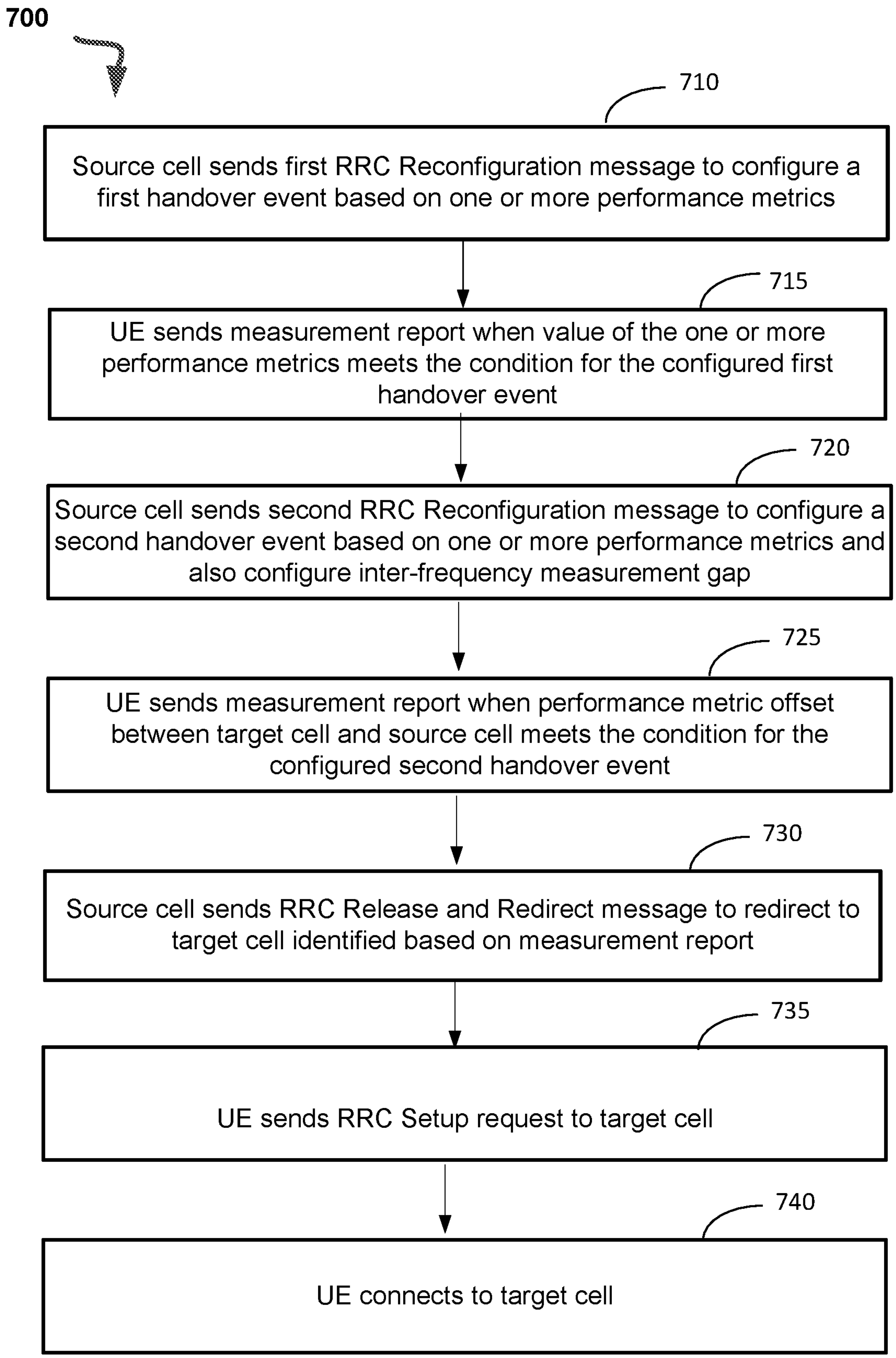
FIG. 7 is a flow diagram of the example method corresponding to the sequence diagram depicted in FIG. 6.

FIG. 6 is a high-level sequence diagram ("call flow") of a process for RRC Release and Redirection, according to an embodiment of the present disclosure. Note that the term "Handover" has been broadly used in the specification to encompass "Release and Redirection" method as well. In certain embodiments, the regular handover method described above is called a "Blind" handover. FIG. 7 is a flow diagram of the example method corresponding to the sequence diagram depicted in FIG. 6. FIGS. 6 and 7 are described together below.

The operations 710, 715, 720 and 725 of method 700 are identical to the operations 510, 515, 520 and 525 of method 500 shown in FIG. 5.

At operation 730, instead of handover preparation (as in operation 530), source cell sends an RRC Release and Redirect message 618 containing frequency band information for target cell(s). For example, the target cell can be on ARFCN B or on ARFCN A, i.e., same as the ARFCN of the source cell.

At operation 735, the UE starts the RRC Setup process by sending an RRC Setup Request 620 to the target cell.

The handover manager 150 can determine, based on the one or more performance metrics associated with the different nodes, whether handover is a preferred method or Release and Redirect is a preferred method to transfer a call to a new cell. For voice calls, handover method is preferred, as Release and Redirect method may take longer and has more uncertainty, risking awkward silence or a "call drop" during the voice call and compromising user experience. For data calls, a Release and Redirect may be equally effective as a regular handover process described in FIGS. 4 and 5. In certain embodiments, Release and Redirect method can be combined with regular handover method.

Additionally, as described above, any suitable performance metric can be used for regular handover or the Release and Redirect method. For example, a Release and Redirect method can use SS-SINR as the metric for inter-frequency handover in combination with or in place of SS-RSRQ as the relevant metric. Time intervals 625, 627, and 629 are similar to the time intervals 425, 427, and 429. Time interval 631 is the processing time for the source cell to analyze the second measurement report 616 and issue an RRC Release and Redirect command. Time interval 633 is the processing time for the UE to analyze the Release and Redirection parameters and issue the RRC Setup request 620.

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions. One or more non-transitory, computer-readable storage media can have computer-readable instructions stored thereon which, when executed by one or more processing devices, cause the one or more processing devices to perform the operations described herein.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of dynamic handover of an ongoing communication session within a cellular network, the method comprising:

calculating a plurality of performance metrics associated with a plurality of nodes of the cellular network, each performance metric of the plurality of performance metrics characterizing at least one of: quality of a received reference signal measured at a user equipment (UE), power level of the received reference signal measured at the UE, and a signal to interference plus noise ratio measured at the UE;

determining, based on one or more of the plurality of performance metrics, a plurality of possible trigger criteria for a dynamic handover of the ongoing communication session from a first node of the plurality of nodes to a second node of the plurality of nodes;

automatically selecting, based on a stored log of historical handover outcomes indicating successful and unsuccessful handovers using respective different trigger criteria for handovers between the first node and the second node under different handover scenarios, a particular trigger criterion from the plurality of possible trigger criteria for handover between the first node and the second node; and applying the particular trigger criterion to the dynamic handover of the ongoing communication session when the UE moves away from the first node towards the second node.

2. The method of claim 1, wherein both the first node and the second node are operated by a first operator who operates the cellular network.

3. The method of claim 2, wherein determining the plurality of possible trigger criteria further comprises:

determining that a value of a first performance metric associated with the first node fails to meet a predetermined threshold value in a presence of external interference caused by a second cellular network operated by a second operator different from the first operator.

4. The method of claim 3, further comprising:

combining a second performance metric with the first performance metric to determine a first trigger criterion; and adding the first trigger criterion among a list of the plurality of possible trigger criteria for handover between the first node and the second node.

5. The method of claim 1, wherein calculating the plurality of performance metrics further comprises:

sending a Radio Resource Control (RRC) reconfiguration message to the UE;

receiving a measurement report from the UE, the measurement report containing measured values of Reference Signal Received Power (RSRP), Reference Signal Received Quality (RSRQ), and Signal-to-interference-plus-noise ratio (SINR); and calculating the plurality of performance metrics based on the measured values of RSRP, RSRQ and SINR.

6. The method of claim 1, wherein the first node is associated with a first frequency channel and the second node is associated with a second frequency channel.

7. The method of claim 6, wherein the dynamic handover comprises an inter-frequency handover, wherein the first frequency channel and the second frequency channel have different frequencies.

8. The method of claim 6, wherein the dynamic handover comprises an intra-frequency handover, wherein the first frequency channel and the second frequency channel have a same frequency.

9. The method of claim 1, wherein the different handover scenarios correspond to different times of day.

10. A system to facilitate dynamic handover of an ongoing communication session within a cellular network, the system comprising:

one or more processing devices; and memory communicatively coupled with and readable by the one or more processing devices and having stored therein processor-readable instructions which, when executed by the one or more processing devices, cause the one or more processing devices to perform operations comprising:

calculating a plurality of performance metrics associated with a plurality of nodes of the cellular network, each performance metric of the plurality of performance metrics characterizing at least one of: quality of a received reference signal measured at a user equipment (UE), power level of the received reference signal measured at the UE, and a signal to interference plus noise ratio measured at the UE;

determining, based on one or more of the plurality of performance metrics, a plurality of possible trigger criteria for a dynamic handover of the ongoing communication session from a first node of the plurality of nodes to a second node of the plurality of nodes;

automatically selecting, based on a stored log of historical handover outcomes indicating successful and unsuccessful handovers using respective different trigger criteria for handovers between the first node and the second node under different handover scenarios, a particular trigger criterion from the plurality of possible trigger criteria for handover between the first node and the second node; and applying the particular trigger criterion to the dynamic handover of the ongoing communication session when the UE moves away from the first node towards the second node.

11. The system of claim 10, wherein both the first node and the second node are operated by a first operator who operates the cellular network.

12. The system of claim 11, wherein the operation of determining the plurality of possible trigger criteria further comprises:

determining that a value of a first performance metric associated with the first node fails to meet a predetermined threshold value in a presence of external interference caused by a second cellular network operated by a second operator different from the first operator.

13. The system of claim 12, wherein the operation further comprises:

combining a second performance metric with the first performance metric to determine a first trigger criterion; and adding the first trigger criterion among a list of the plurality of possible trigger criteria for handover between the first node and the second node.

14. The system of claim 10, wherein the operation of calculating the plurality of performance metrics further comprises:

sending a Radio Resource Control (RRC) reconfiguration message to the UE;

receiving a measurement report from the UE, the measurement report containing measured values of Reference Signal Received Power (RSRP), Reference Signal Received Quality (RSRQ), and Signal-to-Interference-plus-Noise Ratio (SINR); and calculating the plurality of performance metrics based on the measured values of RSRP, RSRQ and SINR.

15. The system of claim 10, wherein the first node is associated with a first frequency channel and the second node is associated with a second frequency channel.

16. The system of claim 15, wherein the dynamic handover comprises an inter-frequency handover, wherein the first frequency channel and the second frequency channels-channel have different frequencies.

17. The system of claim 15, wherein the dynamic handover comprises an intra-frequency handover, wherein the first frequency channel and the second frequency channel have a same frequency.

18. The system of claim 10, wherein the different handover scenarios correspond to different times of day.

19. One or more non-transitory, computer-readable storage media having computer-readable instructions thereon which, when executed by one or more processing devices, cause the one or more processing devices to perform operations to facilitate dynamic handover of an ongoing communication session within a cellular network, the operations comprising:

calculating a plurality of performance metrics associated with a plurality of nodes of the cellular network, each performance metric of the plurality of performance metrics characterizing at least one of: quality of a received reference signal measured at a user equipment (UE), power level of the received reference signal measured at the UE, and a signal to interference plus noise ratio measured at the UE;

determining, based on one or more of the plurality of performance metrics, a plurality of possible trigger criteria for a dynamic handover of the ongoing communication session from a first node of the plurality of nodes to a second node of the plurality of nodes;

automatically selecting, based on a stored log of historical handover outcomes indicating successful and unsuccessful handovers using respective different trigger criteria for handovers between the first node and the second node under different handover scenarios, a particular trigger criterion from the plurality of possible trigger criteria for handover between the first node and the second node; and applying the particular trigger criterion to the dynamic handover of the ongoing communication session when the UE moves away from the first node towards the second node.

20. The one or more non-transitory, computer-readable storage media of claim 19, wherein the operation of calculating the plurality of performance metrics further comprises:

sending a Radio Resource Control (RRC) reconfiguration message to the UE;

receiving a measurement report from the UE, the measurement report containing measured values of Reference Signal Received Power (RSRP), Reference Signal Received Quality (RSRQ), and Signal-to-Interference-plus-Noise Ratio (SINR); and calculating the plurality of performance metrics based on the measured values of RSRP, RSRQ and SINR.

21. The one or more non-transitory, computer-readable storage media of claim 19, wherein the first node is associated with a first frequency channel and the second node is associated with a second frequency channel.

22. The one or more non-transitory, computer-readable storage media of claim 21, wherein the dynamic handover comprises an inter-frequency handover, wherein the first frequency channel and the second frequency channel have different frequencies, or the dynamic handover comprises an intra-frequency handover, wherein the first frequency channel and the second frequency channel have a same frequency.

23. The one or more non-transitory, computer-readable storage media of claim 19, wherein the different handover scenarios correspond to different times of day.

* * * * *